Figure 1:
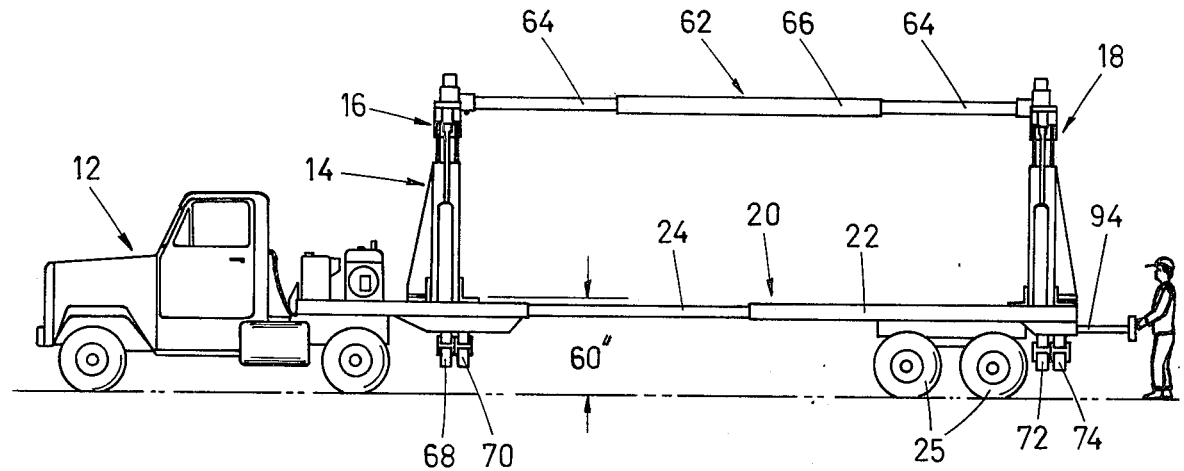

United States Patent [19]
Hand

[11] 3,958,702
[45] May 25, 1976

[54] MOBILE LOAD HANDLING APPARATUS

[75] Inventor: Albert Michael Hand, Cheltenham, Canada

[73] Assignee: Steadman Containers Limited, Brampton, Canada

[22] Filed: Jan. 2, 1975

[21] Appl. No.: 538,084

[52] U.S. Cl. .......................... 214/38 CA; 212/145; 214/77 R
[51] Int. Cl.² ...................... B65G 67/04; B60P 1/48
[58] Field of Search......... 214/38 A, 38 CA, 38 CC, 214/77 R, 80; 212/8 R, 8 A, 8 B, 145; 280/150.5

[56] References Cited
UNITED STATES PATENTS

| | | | |
|---|---|---|---|
| 3,073,458 | 1/1963 | Wieschel | 212/145 |
| 3,485,392 | 12/1969 | Lofgren | 214/77 R |
| 3,515,295 | 6/1970 | Klaus | 214/77 R |
| 3,523,620 | 8/1970 | Klaus | 214/77 R |
| 3,557,980 | 1/1971 | Klaus | 214/77 R |
| 3,612,308 | 10/1971 | Klaus | 214/77 R |
| 3,743,108 | 7/1973 | Visser | 212/145 |
| 3,780,877 | 12/1973 | Levitt | 212/8 B |

*Primary Examiner*—L. J. Paperner

[57] ABSTRACT

Mobile load handling apparatus for handling elongated loads includes an elongated platform supported at an elevation above ground, and a crane at each end of said platform for alignment with a corresponding end of an elongated load. Each crane has an elongated mast with a base by which it is attached to the platform for radial movement thereon between one position in which it is disposed substantially horizontally across the corresponding end of the platform and another position in which it is disposed substantially erectly at one side of the platform. A jack is interconnected between the mast and the platform and is extendable and contractable to move the mast between its two positions. The mast has a free end opposite the base and an arm attached thereto at the free end for swinging thereon between an outstretched position in which it is in substantial axial alignment with the mast and a jack-knife position in which it forms a sharply acute angle with the mast. A further jack is interconnected between the mast and the arm and is extendable and contractable to move the arm between the two positions aforesaid relative to the mast, the arm having a free end remote from its point of attachment to the mast and an extension at the free end which is retractably propellable to lengthen and shorten the arm. A double-ended beam is suspended from the extension and is balanced to retain a substantially horizontal orientation irrespective of the positioning of the arm, and each end of the beam has locking devices cooperable with the top of said load. The height of the platform and the proportions of the mast and arm are scaled to enable stacking of two standard freight containers one on top of the other on one side of the platform and loading of one such container on a vehicle of standard height on the other side of the platform.

6 Claims, 7 Drawing Figures

MOBILE LOAD HANDLING APPARATUS

This invention concerns load handling apparatus for handling elongated loads, for example, freight containers.

The transportation of freight in containers has become very popular, largely in view of the relative ease with which freight in such containers can be transported by land, sea or air, and also in view of the relative ease with which such containers can be transferred from one form of transport onto another. The transportation of freight in such containers also provides greater protection against damage and pilferage, which are important factors in shipping operations.

The use of such freight containers has in fact now become so popular that their size is substantially standardized, the usual standard freight container having a width of 8 feet, a height of 8 feet, with a length which may be 20 feet or 40 feet. Standard freight containers are constructed with a rigid frame, with rigid side, end, bottom and top walls secured thereto.

Various types of load handling apparatus have been proposed for loading or unloading freight containers on or from various forms of transport. One type of load handling apparatus is required for loading or unloading freight containers onto or from road or rail vehicles. However, load handling apparatus of this type has in the past had undesirable limitations in their modes of operation.

It is therefore an object of the present invention to provide load handling apparatus which has a greater versatility than known load handling apparatus of this type.

In accordance with the invention, load handling apparatus includes an elongated platform supported at an elevation above ground and a crane at each end of the platform for alignment with a corresponding end of an elongated load. Each crane has an elongated mast having a base mounted on the platform for radial movement thereon from one position in which it is located substantially horizontally across the corresponding end of the platform and another position in which it is substantially erect at one side of the platform. An extendable and contractable jack is interconnected between the mast and the platform for moving it in this manner. The mast has a free end opposite the base and an arm attached thereto at the free end for swinging movement between an outstretched position in which it is in substantial axial alignment with the mast and a jack-knife position in which it forms a sharply acute angle with the mast. A further extendable and contractable jack is interconnected between the mast and the arm for moving the arm between these two positions. The arm has a free end remote from the mast, with a retractably propellable extension at the free end of the arm for lengthening and shortening the arm. A beam is suspended from each arm extension and is maintained in a substantially horizontal orientation irrespective of the positioning of the arm. Each end of the beam has means cooperable with complimentary means at one of the load for selectively engaging the top of the load at that one end. The height of the platform and the proportions of the mast and arm are scaled so that a pair of standard freight containers can be stacked one on top of the other on the ground on one side of the platform and so that one such container can be loaded on a vehicle of standard height on the other side of the platform.

The first mentioned jack may be connected to the platform at a position substantially lower than the position at which the mast is attached to the platform. A longitudinally extending strut may extend between the beams of the two cranes so that the beams are maintained in alignment with one another. The platform and the longitudinally-extending strut may be extendable and contractable so that the load handling apparatus can be adjusted for loads of various lengths.

The load handling apparatus may also have longitudinally spaced pairs of extendable and contractable stabilizers, the stabilizers being extendable into engagement with the ground at positions laterally outwardly of the platform, and contractable into retracted positions. Each pair of stabilizers is preferably located adjacent their respective crane. One stabilizer of each pair is extendable in one direction laterally of the platform, and the other stabilizer of each pair is extendable in the opposite direction laterally of the platform.

Each stabilizer may be mounted for movement about a longitudinally-extending axis, with means provided for effecting movement of each stabilizer about the axis between operative and inoperative attitudes for use when the stabilizer is respectively extended and contracted.

Figure 2:
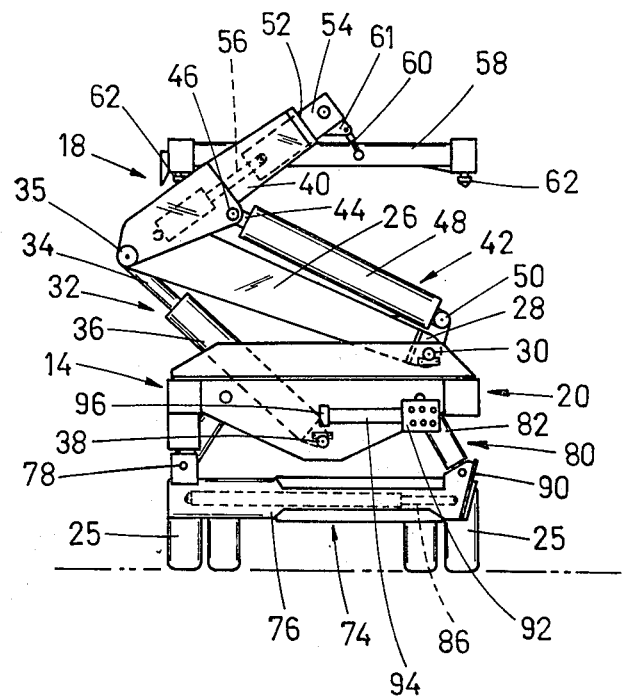
Figure 3:
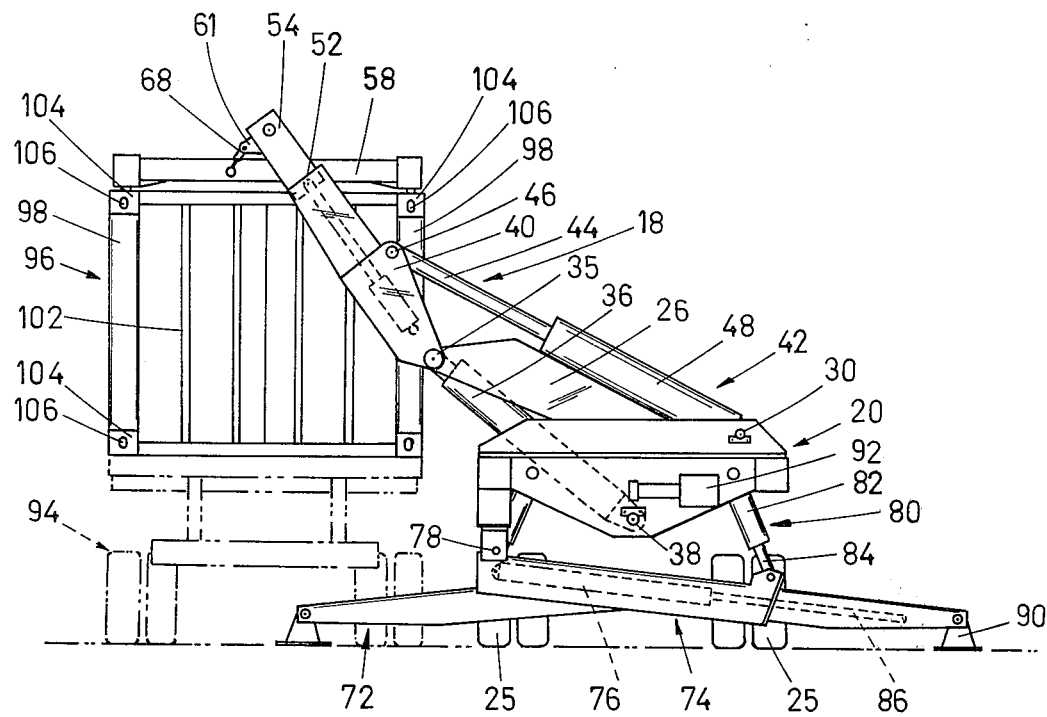
Figure 4:
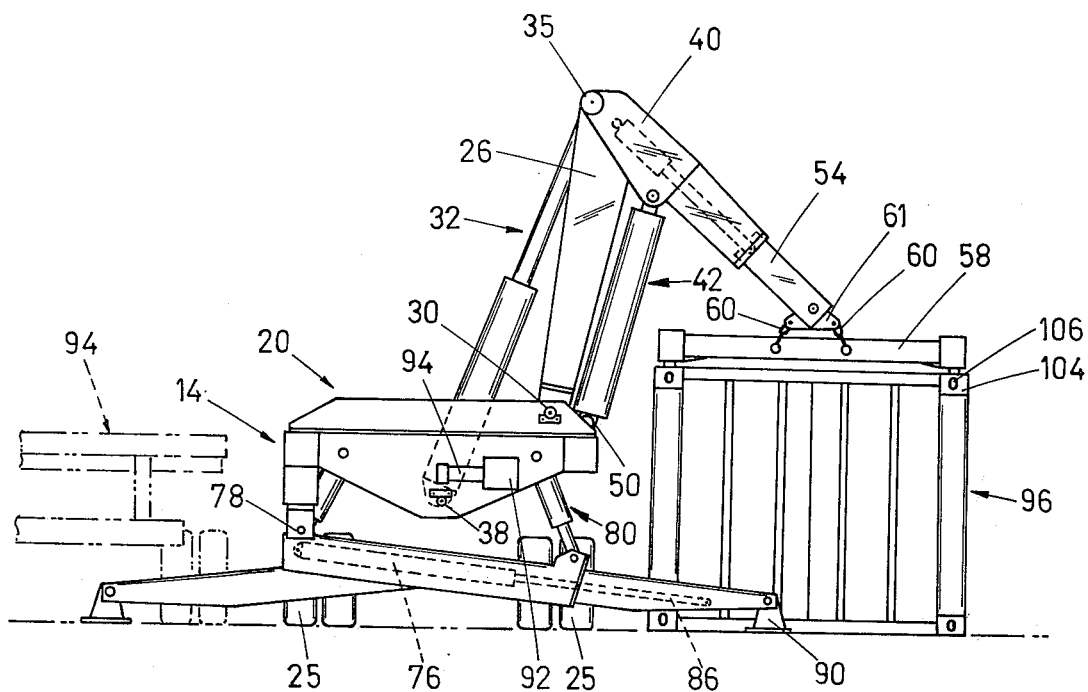
Figure 5:
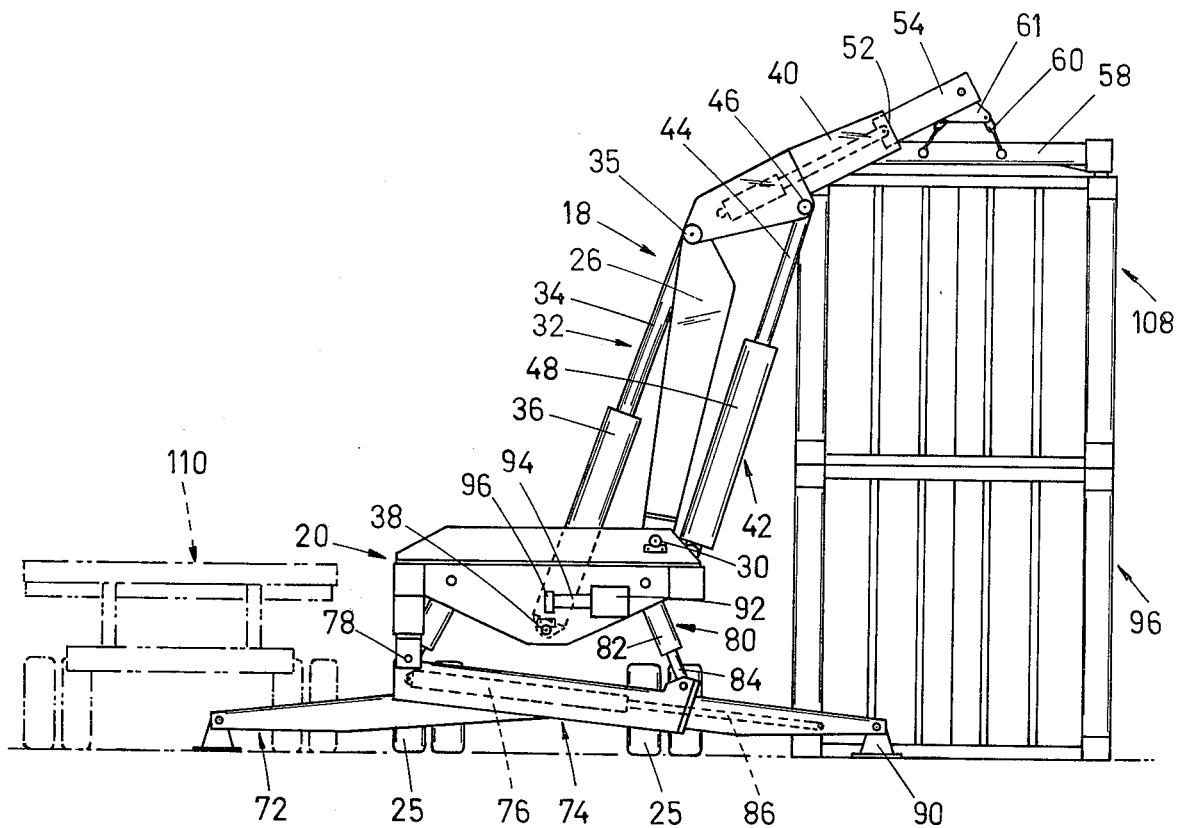
Figure 6:
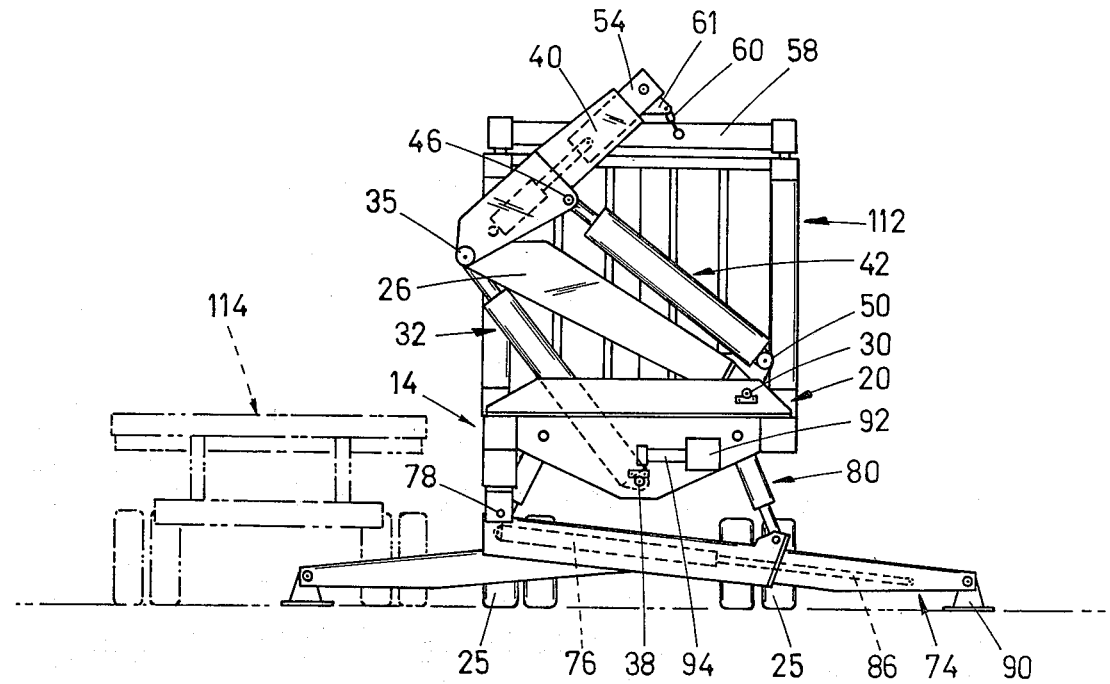
Figure 7:
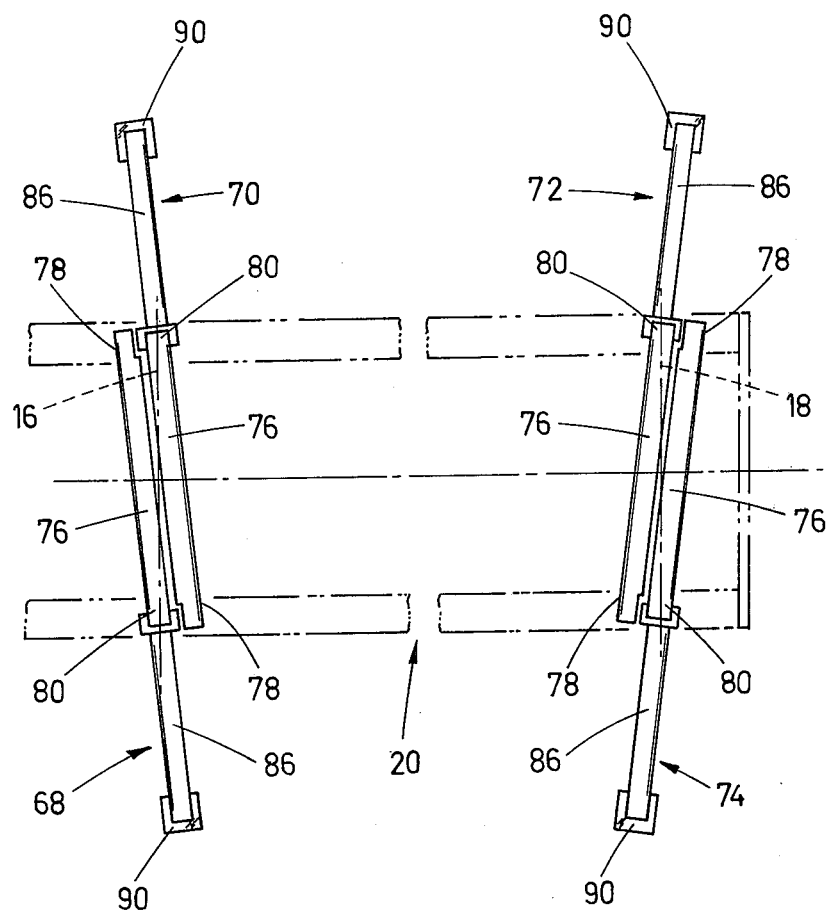

One embodiment of the present invention, will now be described, by way of example, with reference to the accompanying drawings, of which:

FIG. 1 is a side view of load handling apparatus,

FIG. 2 is a rear end view of the load handling apparatus, omitting the tractor, and showing the rear crane in a retracted condition, FIG. 3 is a similar view, showing the rear crane in an extended condition for engagement with a freight container mounted on a road trailer located on one side of the load handling apparatus, FIG. 4 is a similar view, showing the rear crane after it has moved the freight container shown in FIG. 3 from the road vehicle onto the ground on the opposite side of the load handling apparatus, FIG. 5 is a similar view, showing the crane positioning a second freight container on top of the freight container shown in FIG. 4, FIG. 6 is a similar view, showing the rear crane positioning a freight container on the platform of the load handling apparatus itself, and FIG. 7 is a diagrammatic plan view of the load handling apparatus showing the angular disposition of the stabilisers.

As shown in FIG. 1 of the accompanying drawings, load handling apparatus in accordance with this embodiment of the invention is in the form of a wheeled-tractor trailer combination having a tractor 12 and a trailer 14 secured thereto in a suitable known articulated manner. The trailer 14 has a front crane 16 at its front end and rear crane 18 at its rear end, with an elongated platform 20 extending between the front and rear cranes 16, 18. The platform 20 has a rear section 22 which is movable along a middle platform section 24, so that the length of the trailer 14 can be adjusted for use with freight containers of different lengths, a suitable mechanism (not shown) being provided for varying the length of the trailer 14 as required. The platform 20 is supported at an elevation above the ground, since it is mounted at its forward end on the tractor 12 and its rear end on road wheels 25. Each crane 16, 18 is similar in construction, and therefore only the rear crane 18 will be described in detail.

Referring now to FIG. 2, the rear crane 18 includes an elongated mast 26 having a base 28 by which it is attached at its lower end to the platform 20 at a pivotal mounting 30 for radial movement on the platform 20 about an axis parallel to the longitudinal axis of the trailer 14, the mast 26 being located at one side of the platform 20. A hydraulic piston-cylinder jack 32 is interconnected between the mast 26 and the platform 20, the piston rod 34 of the jack 32 being connected to the free or upper end 35 of the mast 26, and the cylinder 36 of the jack 32 being connected to the platform 20 at a pivotal mounting 38. The pivotal mounting 38 is located mid-way between the sides of the platform 20 and is substantially lower than the pivotal mounting 30, the pivotal mounting 38 being at a height above ground of just over half the height of the pivotal mounting 30. As will be described in more detail later, the mast 26 can be moved from one position, shown in FIG. 2, in which it is located substantially horizontally across the platform 20 into another position, shown in FIGS. 4 and 5, in which it is located substantially erectly at the side of the platform in which the mast 26 is mounted.

The rear crane 18 also includes an arm 40 pivotally attached at one end to the free end 35 of the mast 26. A further hydraulic piston-cylinder jack 42 is interconnected between the mast 26 and the arm 40, the piston rod 44 of the jack 42 being pivotally connected to the arm 40 at a mounting 46 part way along the length of the arm 40, and the cylinder 48 of the jack 42 being pivotally connected to the base 28 of the mast 26 at a mounting 50. As will also be described in more detail later, the arm 40 can be moved from a jack-knife position, shown in FIGS. 2, 4 and 6, in which it is at a sharply acute angle to the mast 26 into an outstretched position, shown in FIG. 3 in which it is in substantial alignment with the mast 26.

The arm 40 has a free end 52 remote from its point of attachment to the mast 26, and the free end 52 has an extension 54 which is slidably mounted in the arm 40 so that it can be retractably propelled to lengthen and shorten the arm 40, the arm 40 containing a suitably mounted hydraulic jack 56 for this purpose. Retracted positions of the extension 54 are shown in FIGS. 2 and 6, and extended positions are shown in FIGS. 3, 4 and 5.

A beam 58 is suspended by chains 60 from an equaliser plate 61 pivotally mounted on the end of the arm extension 54 so that the beam 58 balanced in a horizontal orientation extending transversely of the platform 20. Each end of the beam 58 has downwardly extending rotatable projections 62, which are engageable with the top of the freight container, as will be described later.

The beams 58 of the front and rear cranes 16, 18 are rigidly interconnected by strut 62 (see FIG. 1) extending between the centres of the beams 58. The strut 62 is telescopic, having end portions 64 which are mounted in a central portion 66, so that the length of the strut 62 can vary with the length of the platform 20.

The platform 20 carries front and rear pairs of stabilizers 68, 70 and 72, 74 (see especially FIG. 1) which are respectively mounted beneath the front and rear cranes 16, 18. Each pair of stabilizers 68, 70 and 72, 74 are similar in construction, and hence only the rear pair of stabilizers 72, 74 will be described, with reference to FIGS. 2 to 6.

The rear pair of stabilizers 72, 74 are extendable and contractable in opposite directions transversely of the platform 20 for movement between retracted positions and operative positions in which they engage the ground on opposite sides of the platform 20 so as to stabilize the load handling apparatus during use.

The stabilizers 72, 74 are mounted one behind the other, the stabilizer 74 being located rearwardly of the stabilizer 72. The stabilizer 74 has a housing 76 which extends across the width of the platform 20, and has one end attached in a pivotal manner to the platform 20 by a mounting 78 at one side of the load handling apparatus. The opposite end of the housing 76 is connected to the opposite side of the platform 20 by a hydraulic piston-cylinder jack 80, which is operable to raise and lower the stabilizer housing 76 between an inoperative attitude shown in FIGS. 1 and 2, and an operative attitude shown in FIGS. 3 to 6, the cylinder 82 of the jack being pivotally connected to the platform 20 and the piston rod 84 of the jack 80 being pivotally connected to the stabilizer housing 76.

A stabilizer leg 86 is slidably mounted in the stabilizer housing 76, and is protractable and retractable relative thereto by means of a hydraulic jack 88. A stabilizer foot 90 is pivotally attached at 92 to the free end of the stabilizer leg 86. In the retracted position shown in FIGS. 1 and 2, the stabilizer leg 84 and part of the foot 90 are withdrawn into the stabilizer housing 76. In the protracted position shown in FIGS. 3 to 6, the leg 86 is extended outwardly from the housing 76, and the foot 90 engages the ground.

The stabilizer 72 is mounted forwardly of and in the reverse lateral sense to the stabilizer 74, that is to say, the stabilizer 74 is mounted for extension into engagement with the ground on one side of the platform 20, and the stablizer 72 is mounted for extension into engagement with the ground on the other side of the platform 20.

All the various hydraulic jacks are connected to a hydraulic pump in a suitable hydraulic circuit, the nature of which will be readily apparent to the man skilled in the art, and therefore it is not believed necessary to describe a suitable hydraulic circuit in detail. The hydraulic circuit includes a control console 92 which is manually operable to control the various jacks in the manner described, and the control console 92 is mounted at the free end of an arm 94, whose other end is hinged at 96 to the rear end of the platform 20. The arm 94 can be swung between a retracted position in which it lies along the end face of the platform 20, and an operating position in which it extends perpendicularly rearwardly from the end of the platform 20.

FIG. 1 shows the load handling apparatus with its cranes 16, 18 and stabilizers 68, 70 and 72, 74 suitably positioned for movement of the load handling apparatus from one place to another. For purposes of illustration only, the arm 94 carrying the hydraulic control console 92 is shown in its operating position projecting beyond the back of the vehicle in FIG. 1, but it will be understood that, when the load handling apparatus is being moved from one place to another, the arm 94 will be in its stowed position in which it lies along the rear end of the platform 20, as shown in FIG. 2. FIG. 2 shows how the cranes 16, 18 can be positioned to occupy a minimum amount of space, and thus facilitate transportation of the load handling apparatus from one place to another. The inoperative, retracted positions of the stabilizers 72, 74 are also shown.

FIG. 3 shows the load handling apparatus located at an unloading site. Before the cranes 16, 18 are operated, the stabilizers 68, 70 and 72, 74 are moved into their operating positions. For example, with the stabilizer 74, the jack 80 is extended to lower the housing 76 from its substantially horizontal inoperative attitude into a downwardly inclined operative attitude. The jack 86 within the housing 70 is then extended to propel the stabilizer leg 80 outwardly until the stabilizer foot 90 is firmly engaged with the ground. The stabilizer foot 90 hangs in pendulum fashion from the pivotal mounting 92 at the free end of the leg 86, so that it can hang downwardly therefrom and conform to the slope of the ground. The other rear stabilizer 72 and the front stabilizers 68, 70 are similarly operated, so that the stabilizers engage the ground on the opposite sides of the platform adjacent the front and rear cranes 16, 18 respectively.

FIG. 3 also shows a trailer 94 in dotted outline, the load handling apparatus having been positioned along side the trailer 94 prior to extension of the stabilizers. A standard freight container 96 is mounted on the trailer 94. FIG. 3 shows a rear end of the container 96, and the container 96 has a length approximately equal to the length of the platform 20 between the cranes 16, 18, with the container 96 therefore having a front end adjacent the front crane 16. However, for simplicity, only the operation of the rear crane 18 adjacent the rear end of the container 96 will be described, and it will be understood that similar operations are carried out by the front crane 16 at the front end of the container, simultaneously with those carried out by the rear crane 18 at the rear end of the container. The trailer 94 carries the standard container 96 as a standard height above ground, which is also the height of the platform 20 above ground.

The standard freight container 96 has as shown, a frame 98, an end wall 102 and corner castings 104. Each corner casting 104 has elongated apertures 106 in its exposed faces, each corner casting 104 consequently having three such apertures 106, namely, one in the vertical end face shown in FIG. 3, one in its vertical side face, and one in the top face.

In order to move the crane 18 from the attitude shown in FIG. 2 into the attitude shown in FIG. 3, the jacks 32, 42 and 36 are appropriately actuated from the control console 92. In particular, jack 32 is contracted, and jacks 42 and 36 are extended in such a manner that the beam 58 is moved to the position shown in FIG. 3. In this position, the downwardly-extending projections 62 at opposite ends of the beam 58 each pass, while in unlocked positions, into respective elongated apertures 106 in the top corner castings 104 of the freight container 96. The projections 62 are rotated to locked positions by remote control from the control console 92 so that they become positively engaged in the respective corner castings 104, the projections 62 being appropriately shaped so that they cannot be withdrawn from the corner castings 104 when they have been rotated to the locked positions, the projections 62 only being capable of movement through the casting apertures 106 when the projections 62 are in the unlocked position.

With the projections 62 in the locked position, the control console 92 is then operated to bring the crane 18 to the position shown in FIG. 4, lifting the container 96 off the trailer 94, swinging it over the platform 20 and lowering it to the ground on the opposite side of the platform 20 to the trailer 94. In other words, the control console 92 is operated to extend the jack 32, contract the jack 42 and further extend the jack 56. Thus, in moving from the attitude shown in FIG. 3 to the attitude shown in FIG. 4, the mast 26 is moved radially about its base mounting 30 from a position in which it is located substantially horizontally across the platform 20 to a substantially erect position at the side of the platform 20 at which the mast 26 is mounted. The arm extension 54 is also extended further from the arm 40. Also, the arm 40 is moved angularly relative to the mast 26 from an outstretched position in which it is in substantial axial alignment with the mast 26 to a jack-knife position in which it forms a sharply acute angle with the mast 26.

Once the container 96 has been deposited on the ground, the control console 92 is operated to cause rotation of the locking projections 62 to their unlocked positions, thereby freeing the beam 58 from the container 96.

The unloaded trailer 94 is then moved away, it being of course necessary to retract the forward and rear stabilizers 68 and 72 on that side of the load handling apparatus, and a further vehicle carrying a standard freight container is positioned in its place, the stabilizer 68 and 72 then being returned to their operative positions. The further container is unloaded by operating the control console 92 to return the rear crane 18 to the attitude shown in FIG. 3, and engage the locking projections 62 in the corner casting 104 of the further container. The control console 92 is then actuated to swing the further container from the trailer over the platform 20 and onto the top of the first container. FIG. 5 shows the further container 108 on top of the first container 98, and also shows the trailer 110 from which the container 108 has been unloaded.

As previously mentioned, the various movements of the rear crane 18 previously described with reference to FIGS. 3 to 5 are duplicated by the front crane 16 by actuation of the control console 92. It will also be apparent that the load handling apparatus can be operated in the reverse manner to that just described. In other words, the containers 108 and 96 shown in FIG. 5 can be loaded onto successive trailers on the opposite side of the platform 20.

Thus, the load handling apparatus can load or unload containers onto or from vehicles on one side of the platform 20, and can place them on or remove them from the ground, or place them on or remove them from the top of another container on the ground on the opposite side of the platform 20. The load handling apparatus can also be moved, with its stabilizers retracted, from one place to another. For example, having unloaded containers 96 and 108, the load handling apparatus can be moved forwardly by one container length at a time, so that it can unload further containers from vehicles successively positioned along side the load handling apparatus and stack them in pairs, one on top of the other, as was done with containers 96 and 108.

Also, if necessary, a container can be transported from one site to another by the load handling apparatus itself. FIG. 6 shows a container 112 which has been unloaded from a vehicle 114, and positioned on the platform 20 between the front and rear cranes 16, 18. The stabilizers are, of course, retracted to their inoperative positions during movement of the load handling apparatus from one site to another.

As indicated in FIG. 7, the front stabilizers 68, 70 and the rear stabilizers 72, 74 are inclined to each other in the horizontal plane. On the vehicle unloading side of the apparatus, the front and rear stabilizers 68, 74 engage the ground with a spacing less than the length of a container, and on the other side of the apparatus the front and rear stabilizers 70, 72 engage the ground with a spacing greater than the length of a container, so that a container can be deposited on the ground between them. This angular disposition of the stabilizers enables the jack 80 of each stabilizer to be positioned directly below the respective crane 16, 18 (whose positions are indicated by dotted lines in FIG. 7), so that stresses on the stabilizers can be transferred through the jacks 80 into the crane structure, and thereby permitting a lighter platform structure than would otherwise be necessary.

The man skilled in the art will readily appreciate the versatility of the described embodiment which is achieved by the ranges of movement and lengths of the mast 26, the arm 40 and the arm extension 54.

Various modifications to the described embodiment, within the scope of the invention, will be apparent to the man skilled in the art, the scope of the invention being defined in the appended claims.

I claim:
1. Mobile load handling apparatus for handling elongated loads comprising:
   an elongated platform supported at an elevation above ground, and
   a crane disposed at each end of said platform, for alignment with a corresponding end of an elongated load to be handled,
   each said crane comprising, in turn,
   an elongated mast having a base by which it is pivotally attached to said platform at one side thereof for radial movement between one position in which it is disposed substantially horizontally across the corresponding end of the platform and another position in which it is disposed substantially erectly at the same side of the platform,
   a jack pivotally interconnected between said mast and said platform and extendable and contractable to move the mast between its two positions as aforesaid,
   said jack being pivotal about a fixed point substantially below the level at which said mast is attached to said platform and generally centrally of said platform,
   said mast having a free end opposite said base and an arm attached thereto at said free end for swinging thereon between an outstretched position in which it is in substantial axial alignment with said mast and a jack-knife position in which it forms a sharply acute angle with the mast,
   a jack interconnected between said mast and said arm and extendable and contractable to move the arm between the two positions aforesaid relative to the mast,
   said arm having a free end remote from its point of attachment to the mast and an extension at said free end which is retractably propellable to lengthen and shorten said arm,
   a double-ended beam suspended from said extension and balanced to retain a substantially horizontal orientation irrespective of the positioning of said arm, and
   means at each end of said beam co-operable with complementary means correspondingly spaced and located at one end of said elongated load for selectively engaging the top of said load at said one end,
   the height of said platform and the proportions of said mast and arm being scaled to enable stacking of two standard freight containers one on top of the other on one side of the platform and loading of one such container on a vehicle of standard height on the other side of the platform.

2. Load handling apparatus according to claim 1 including a longitudinally-extending strut rigidly connected to and extending between said beams.

3. Load handling apparatus according to claim 2 wherein said platform and said longitudinally-extending strut are extendable and contractable to adjust the apparatus for loads of various lengths.

4. Load handling apparatus according to claim 1 including longitudinally-spaced pairs of extendable and contractable stabilizers, said stabilizers being extendable into engagement with the ground at positions laterally outwardly of the platform and contractable to retracted positions, each pair of stabilizers being located adjacent a respective crane, one stabilizer of each pair being extendable in one direction laterally of the platform and the other stabilizer of each pair being extendable in the opposite direction laterally of the platform.

5. Load handling apparatus according to claim 4 wherein each stabilizer is pivotally mounted for movement about a longitudinally-extending axis, and including means for effecting movement of each stabilizer about said axis between operative and inoperative attitudes for use when the stabilizer is respectively extended and contracted.

6. Load handling apparatus according to claim 5 wherein each said means for effecting pivotal movement of a stabilizer is located directly below a respective crane, the stabilizers of one pair being inclined in a horizontal plane to the stabilizers of the other pair; and the stabilizers on the side of the platform on which containers are stacked on the ground engaging the ground with a spacing greater than the length of a container.

* * * * *